(12) United States Patent
Kuo et al.

(10) Patent No.: US 12,683,847 B2
(45) Date of Patent: Jul. 14, 2026

(54) UNIFIED AND CONFIGURABLE WAVEFORM FRAMEWORK FOR 6G

(71) Applicant: MEDIATEK INC., Hsinchu City (TW)

(72) Inventors: Chun-Hsuan Kuo, San Jose, CA (US); Michael Mingxi Fan, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 11 days.

(21) Appl. No.: 18/841,767

(22) PCT Filed: Apr. 6, 2023

(86) PCT No.: PCT/CN2023/086478
§ 371 (c)(1),
(2) Date: Aug. 27, 2024

(87) PCT Pub. No.: WO2023/202380
PCT Pub. Date: Oct. 26, 2023

(65) Prior Publication Data
US 2025/0219885 A1      Jul. 3, 2025

Related U.S. Application Data

(60) Provisional application No. 63/331,906, filed on Apr. 18, 2022.

(51) Int. Cl.
H04L 27/26 (2006.01)
H04L 5/00 (2006.01)

(52) U.S. Cl.
CPC ........ H04L 27/2628 (2013.01); H04L 5/0098 (2013.01); H04L 27/2636 (2013.01)

(58) Field of Classification Search
CPC ............... H04L 27/2628; H04L 5/0098; H04L 27/2636; H04L 27/26412; H04L 27/265;
(Continued)

(56) References Cited

U.S. PATENT DOCUMENTS

2001/0016013 A1      8/2001   Feher
2010/0323738 A1*   12/2010   Aiba ..................... H04L 5/0094
                                                                        455/509
(Continued)

FOREIGN PATENT DOCUMENTS

CN        101017383 A     8/2007
CN        112291175 A     1/2021

OTHER PUBLICATIONS

International Search Report and Written Opinion dated May 23, 2023, issued in application No. PCT/CN2023/086478.
(Continued)

*Primary Examiner* — Vineeta S Panwalkar
(74) *Attorney, Agent, or Firm* — McClure, Qualey & Rodack, LLP

(57)      ABSTRACT

Aspects of the present disclosure provide an apparatus that is configured to generate a variety of waveforms. For example, the apparatus can include a plurality of reusable components that are coupled in series with each other. The reusable components can be configurable to generate a first waveform. The apparatus can also include a bypassable component coupled in series with the reusable components. The bypassable components can be bypassable, or be configurable to operate with the reusable components to generate a second waveform different from the first waveform. The apparatus can also include a bypassing controlling component coupled to the reusable components and the bypassable component. The bypassing controlling component can be either configured such that the bypassable component is bypassed and the reusable components generate the first waveform, or configured such that the bypassable component is passed and the bypassable component and the reusable components generate the second waveform.

17 Claims, 11 Drawing Sheets

(58) Field of Classification Search
CPC ......... H04L 27/26526; H04L 27/26536; H04L
27/3405; H04L 27/0008
See application file for complete search history.

(56)                    References Cited

U.S. PATENT DOCUMENTS

| 2012/0051400 | A1* | 3/2012 | Shin .................... | H04L 27/2602 |
| | | | | 375/E1.001 |
| 2020/0220759 | A1* | 7/2020 | Katzav ................ | H04L 27/2626 |
| 2021/0084648 | A1* | 3/2021 | Gilmore ................ | H04B 1/006 |

OTHER PUBLICATIONS

Zhou, H.; "Direct digital frequency synthesis function generator;"
Journal of Mechanical and Electrical Engineering; vol. 28; No. 1;
Jan. 2011; pp. 83-86.
English language translation of abstract of "Direct digital frequency
synthesis function generator;" (p. 1 of publication).

* cited by examiner

UNIFIED AND CONFIGURABLE WAVEFORM FRAMEWORK FOR 6G

INCORPORATION BY REFERENCE

This present application claims the benefit of U.S. Provisional Application No. 63/331,906 "Waveform Framework for 6G" filed on Apr. 18, 2022, which is incorporated herein by reference in its entirety.

TECHNICAL FIELD

The present disclosure relates to wireless communication and, more specifically, to unified and configurable waveform framework for 6G.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

Aspects of the present disclosure provide an apparatus that is configured to generate a variety of waveforms. For example, the apparatus can include a plurality of reusable components that are coupled in series with each other. The reusable components can be configurable to generate a first waveform. The apparatus can also include a bypassable component coupled in series with the reusable components. The bypassable component can be bypassable, or be configurable to operate with the reusable components to generate a second waveform different from the first waveform. The apparatus can also include a bypassing controlling component coupled to the reusable components and the bypassable component. The bypassing controlling component can be either configured such that the bypassable component is bypassed and the reusable components generate the first waveform, or configured such that the bypassable component is passed and the bypassable component and the reusable components generate the second waveform.

In an embodiment, the reusable components can include a subcarrier mapper, an inverse fast Fourier transform (IFFT) module coupled to the subcarrier mapper, and a cyclic prefix (CP) insertion module coupled to the IFFT module, the bypassable component can include a filter coupled to the CP insertion module, the bypassing controlling component can include a filter switch, the first waveform can include a CP-orthogonal frequency division multiplexing (CP-OFDM) waveform, and the second waveform can include a filtered-OFDM (f-OFDM) waveform.

In an embodiment, the reusable components can further include a modulation module coupled to the subcarrier mapper, and the CP-OFDM waveform can be with constellation shaping. In another embodiment, the bypassable component can further include a fast Fourier transform (FFT) module coupled between the modulation module and the subcarrier mapper, the bypassing controlling component can further include a FFT switch, and the second waveform can further include a discrete Fourier transform-spread-OFDM (DFT-s-OFDM) waveform. In some embodiments, the bypassable component can further include a frequency domain pulse shaping module coupled between the FFT module and the subcarrier mapper, the bypassing controlling component can further include a shaping switch, and the second waveform can include a pre-coded pulse-shaped DFT-s-OFDM waveform. In various embodiments, the apparatus can further include a demodulation module that employs a trellis-based Bahl-Cocke-Jelinek-Raviv (BCJR) decoding algorithm. For example, the modulation module can be included in a transmitter of the apparatus, and the demodulation module can be included in a receiver of the apparatus.

In an embodiment, the reusable components can include a subcarrier mapper, an IFFT module coupled to the subcarrier mapper, and a CP insertion module coupled to the IFFT module, the bypassable component can include a FFT module coupled to the subcarrier mapper, the bypassing controlling component can include an FFT switch, the first waveform can include a CP-OFDM waveform, and the second waveform can include a DFT-s-OFDM waveform.

In an embodiment, the reusable components can further include a modulation module coupled to the FFT module, and the CP-OFDM waveform can be with constellation shaping. In another embodiment, the bypassable component can further include a filter coupled to the CP insertion module, the bypassing controlling component can further include a filter switch, and the second waveform can further include a f-OFDM waveform and a pre-coded DFT-s-OFDM waveform. In some embodiments, the bypassable component can further include a frequency domain pulse shaping module coupled between the FFT module and the subcarrier mapper, the bypassing controlling component can further include a shaping switch, and the second waveform can further include a pre-coded pulse-shaped DFT-s-OFDM waveform.

In an embodiment, the reusable components can include a modulation module, a FFT module coupled to the modulation module, a subcarrier mapper coupled to the FFT module, an IFFT module coupled to the subcarrier mapper, and a CP insertion module coupled to the IFFT module, the bypassable component can include a frequency domain pulse shaping module coupled between the FFT module and the subcarrier mapper, the bypassing controlling component can include a shaping switch, the first waveform can include a pre-coded DFT-s-OFDM waveform, and the second waveform can include a pre-coded pulse-shaped DFT-s-OFDM waveform.

In an embodiment, the pre-coded pulse-shaped DFT-s-OFDM waveform can be a continuous pulse modulation-DFT-s-OFDM (CPM-DFT-s-OFDM) waveform, a constrained envelop CPM (CeCPM) waveform, or a TC-DFT-s-OFDM waveform. In another embodiment, the modulation module can employ a run-length-limited code. In some embodiments, the bypassable component can further include a filter coupled to the CP insertion module, the bypassing controlling component can further include a filter switch, and the second waveform can further include a Generalized Frequency Division Multiplexing (GFDM) waveform.

In an embodiment, the reusable components can include a modulation module, a FFT module coupled to the modulation module, a frequency domain pulse shaping module coupled to the FFT module, a subcarrier mapper coupled to the FFT module, an IFFT module coupled to the subcarrier mapper, and a CP insertion module coupled to the IFFT module, the bypassable component can include a filter coupled to the CP insertion module, the bypassing controlling component can include a filter switch, the first waveform can include a pre-coded pulse-shaped DFT-s-OFDM waveform, and the second waveform can include a GFDM waveform.

In an embodiment, the reusable components can include a modulation module, the bypassable component includes a filter, the bypassing controlling component can include a filter switch, the first waveform can include a modulated waveform, and the second waveform can include an on-off keying (OOK) waveform. In another embodiment, the reusable components can include a modulation module and a filter, the bypassing component can include a subcarrier mapper and a transmitting IFFT module coupled to the subcarrier mapper, the first waveform can include an on-off keying (OOK) waveform, and the second waveform can include a peaky-frequency shift keying (FSK) waveform. In some embodiments, the bypassable component can further include a CP insertion module coupled between the transmitting IFFT module and the filter, the bypassing controlling component can further include a CP insertion switch, and the second waveform can further include a CP-OFDM waveform.

Note that this summary section does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the present disclosure and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

During the development for 6G technology, a variety of waveforms and modulation techniques were proposed, like cyclic prefix-orthogonal frequency division multiplexing (CP-OFDM), filtered-OFDM (f-OFDM), etc., to meet different functionality requirements, such as high MIMO order, high spectral/power efficiency, low processing complexity, low peak to average power ratio (PAPR), high time localization to support TDD systems and ultra-reliable low latency (URLLC) use cases, acceptable complexity and low out-of-band (OOB) emissions (OOBE) for a variety of use cases across different bands for downlink (DL), uplink (UL) and sidelink (SL) covering both terrestrial network (TN) and non-terrestrial network (NTN). New use cases were also introduced in 6G communication systems, such as joint communication, positioning and sensing, low resolution ADC, etc.

Finding a single waveform that performs well across all 6G KPIs is difficult. For example, CP-OFDM waveforms can provide good trade-off between spectral efficiency and receiver complexity. However, it is not power efficient due to high PAPR. As another example, continuous pulse modulation (CPM) waveforms, e.g., Gaussian minimum shift keying (GMSK) waveforms, exhibit excellent power efficiency but struggle to support high spectral efficiency.

Supporting multiple waveforms within a single device increases complexity and overheads. For example, a device capable of both communication and sensing may include a CP-OFDM transceiver for communication and an independent frequency modulate continuous wave (FMCW) radar transceiver for sensing.

Figure 1:
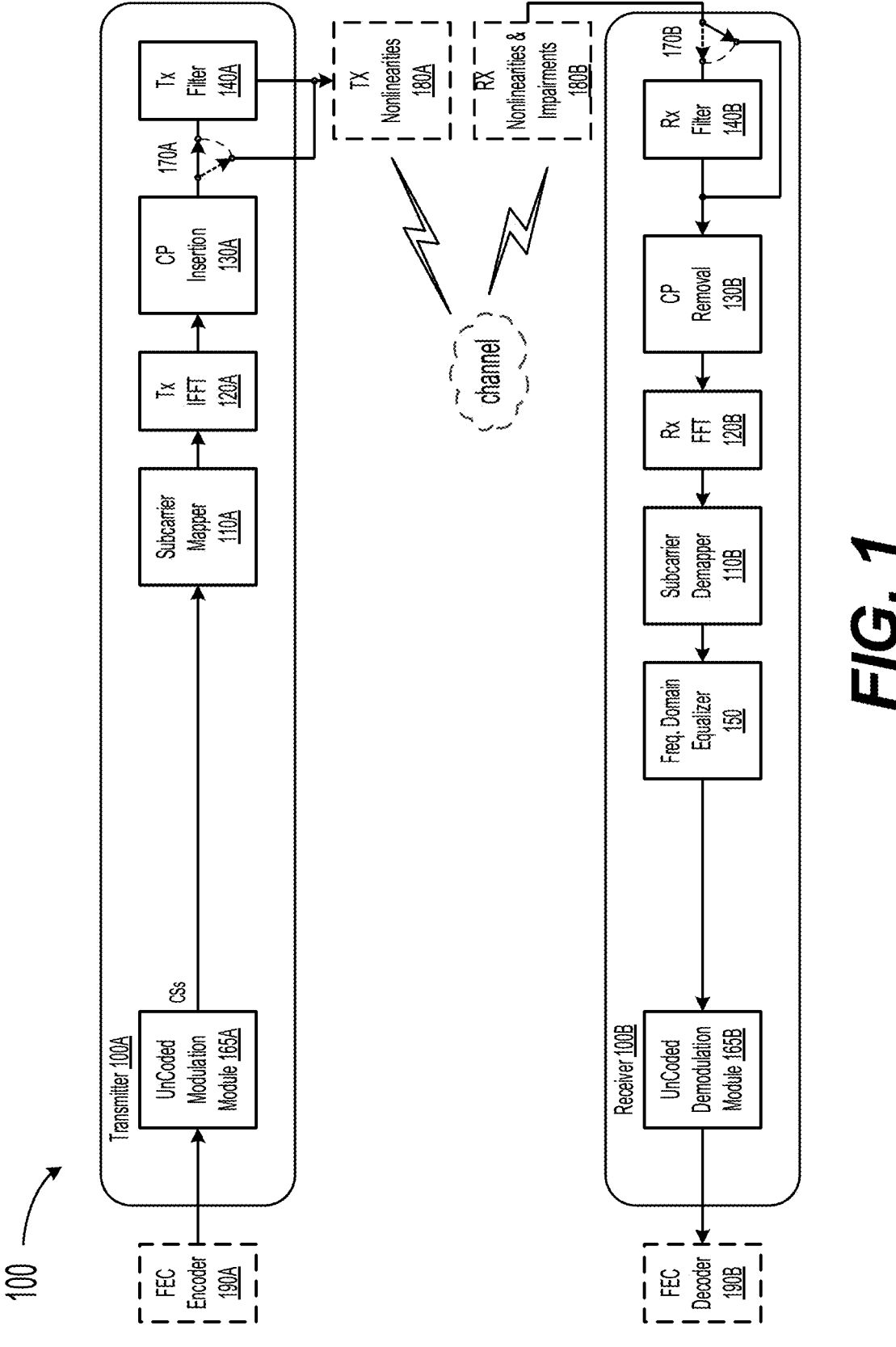
FIG. 1 is a functional block diagram of an exemplary apparatus that can be configured to transmit and receive a variety of waveforms by configuring or bypassing components thereof according to a first embodiment of the present disclosure.

FIG. 1 is a functional block diagram of an exemplary apparatus 100, e.g., a transceiver, that can be configured to transmit and receive a variety of waveforms by configuring or bypassing components thereof, according to a first embodiment of the present disclosure. For example, the transceiver 100 can be configured to transmit and receive CP-OFDM and f-OFDM waveforms. The transceiver 100 can include a transmitter 100A and a receiver 100B.

In an embodiment, the transmitter 100A can include a modulation module 165A, a subcarrier mapper 110A coupled to the modulation module 165A, a transmitting inverse fast Fourier transform (Tx IFFT) module 120A coupled to the subcarrier mapper 110A, and a CP insertion module 130A coupled to the Tx IFFT module 120A. The modulation module 165A can receive input signals that are encoded by a forward error correction (FEC) encoder 190A by appending an error correction code or error correcting code (ECC) thereto in a redundant way, allowing for some errors to be corrected at the receiver 100B. In an embodiment, the modulation module 165A can module the coded input signals using a modulation scheme such as quadrature phase shift keying (QPSK), 16-quadrature amplitude modulation (QAM), 64-QAM, 256-QAM, 1,024-QAM, etc., and generate constellation symbols (CSs). In the example embodiment shown in FIG. 1, the modulation module 165A is shown as the "uncoded" modulation module 165A, which is a special case of "coded" modulation module 165A with the code being an "identity code."

The subcarrier mapper 110A can receive the CMs from the modulation module 165A. The subcarrier mapper 110A (also referred to as a resource element mapper) can map the CSs on each subcarrier in the frequency domain. For example, the subcarrier mapper 110A can map the CSs to resource elements (REs) corresponding to resource blocks (RBs) allocated for data transmission.

The Tx IFFT module 120A can perform IFFT on the CSs mapped to the REs, and output a base band signal for data that is a time domain signal. The CP insertion module 130A can append a CP to the data sequence as guard interval to form CP-OFDM waveforms. For example, the CP insertion module 130A can copy the last part of an IFFT data sequence and insert it at the beginning of the IFFT data sequence, in order to prevent inter-symbol interference (ISI) and inter-carrier interference (ICI), which can result from delays and reflections, so that orthogonality can be maintained even in a multipath channel. The time length of the CP can be chosen to be greater than the expected channel delay spread. A wireless transmitting unit 180A can be used to convert the CP-OFDM waveforms into a radio-frequency (RF) analog signal and transmit the RF analog signal.

CP-OFDM waveforms can be used in downlink and uplink chains in physical layer of 5G NR system. CP-OFDM waveforms can be used for either single-stream and multi-stream (e.g., multiple input multiple output (MIMO)) transmission. CP-OFDM waveforms can offer very high spectral packing efficiency in RBs, due to the orthogonally overlapped subcarriers, and can be employed when network operators need to maximize network capacity in dense urban environments.

CP-OFDM waveforms have a high PAPR due to the random addition of subcarriers in the time domain. As a result of such high peaks, a power amplifier at the transmitter 100A operates in the nonlinear region causing a distortion and spectral spreading. In addition, as the number of subcarriers increases, the variance of the output power increases as well. CP-OFDM waveforms also suffer from high out-of-band emissions (OOBE).

In an embodiment, the transmitter 100A of the transceiver 100 can further include a transmitting filter (e.g., a time domain sampling filter) 140A and a transmitting filter switch 170A. In an embodiment, the transmitting filter 140A can be configured to deal with the OOBE, one of the drawbacks of CP-OFDM waveforms, and generate f-OFDM waveforms.

For example, a sync pulse multiplied by a Hann window can be employed as the transmitting filter 140A. The transmitting filter 140A can perform filtering over an entire band which improves the performance of CP-OFDM in applications that require asynchronous transmissions. In an embodiment, the transmitting filter switch 170A can be configured to connect the CP insertion module 130A either to the transmitting filter 140A or to the wireless transmitting unit 180A. For example, the transmitting filter switch 170A can be configured to connect the CP insertion module 130A to the wireless transmitting unit 180A, i.e., bypassing the transmitting filter 140A (which can be therefore referred to as bypassable component), and therefore the wireless transmitting unit 180A can transmit the CP-OFDM waveforms generated from the CP insertion module 130A. As another example, the transmitting filter switch 170A can be configured to connect the CP insertion module 130A to the transmitting filter 140A, and therefore the wireless transmitting unit 180A can transmit the f-OFDM waveforms generated from the transmitting filter 140A.

In the transceiver 100, the subcarrier mapper 110A, the Tx IFFT module 120A and the CP insertion module 130A (which can be referred to as reusable components) can be reused to form the CP-OFDM and f-OFDM waveforms.

Universal filtered multicarrier (UFMC) can combine CP-OFDM and f-OFDM, by applying filtering to subbands instead of the entire band, as in the case for f-OFDM. For example, the filtering operation for the subband wise processing can be performed based on a Dolph-Chebyshev window. Subband-based filtering can be applied to suppress the inter-subband interference, and the time-domain orthogonality between consecutive OFDM symbols in each subband can be broken intentionally for a lower OOBE with negligible performance loss in other aspects. Consequently, asynchronous transmission across subbands can be supported. In UFMC, the filtering is only done at the transmitter 100A.

The receiver 100B can follow the reverse operations of the transmitter 100A. For example, the receiver 100B can include a receiving filter 140B, a CP removal module 130B coupled to the receiver 140B, a receiving (Rx) FFT module 120B coupled to the CP removal module 130B, a subcarrier demapper 110B coupled to the Rx FFT module 120B, a frequency domain equalizer 150 coupled to the subcarrier demapper 110B, and a demodulation module 165B coupled to the frequency domain equalizer 150. The analog signal transmitted from the wireless transmitting unit 180A can be received at a wireless receiving unit 180B and converted into a digital signal, i.e., the CP-OFDM and f-OFDM waveforms. In an embodiment, the receiver 100B can further include a receiving filter switch 170B, which can be configured to connect the wireless receiving unit 180B either to the receiving filter 140B or to the CP removal module 130B and function in association with the transmitting filter switch 170A. For example, when the transmitting filter switch 170A is configured to connect the CP insertion module 130A to the wireless transmitting unit 180A, i.e., bypassing the transmitting filter 140A, and thus the transmitter 100A transmits the CP-OFDM waveforms, the receiving filter switch 170B is configured to connect the wireless receiving unit 180B to the CP removal module 130B, i.e., bypassing the receiving filter 140B. As another example, when the transmitting filter switch 170A is configured to connect the CP insertion module 130A to the transmitting filter 140A and thus the transmitter 100A transmits the f-OFDM waveforms, the receiving filter switch 170B is configured to connect the wireless receiving unit 180B to the receiving filter 140B. In an embodiment, the CP removal module 130B can remove the CPs of the CP-OFDM and f-OFDM waveforms converted at the wireless receiving unit 180B. The Rx FFT module 120B can perform FFT on the CP-OFDM and f-OFDM waveforms in the time domain and output their individual spectral components in the frequency domain. The subcarrier demapper 110B can extract subcarriers mapped by the subcarrier mapper 110A to the CSs. The frequency domain equalizer 150 can revert the propagation channel variation imparted to the CSs during radio communication. The demodulation module 165B can demodulate and restore the CSs to the coded input signals. An FEC decoder 190B can remove the ECC in the coded input signal, and restore to the original input signals. In the example embodiment shown in FIG. 1, as the input signals are appended with the identity code, the demodulation module 165B is shown as "uncoded" demodulation module 165B.

Figure 2:
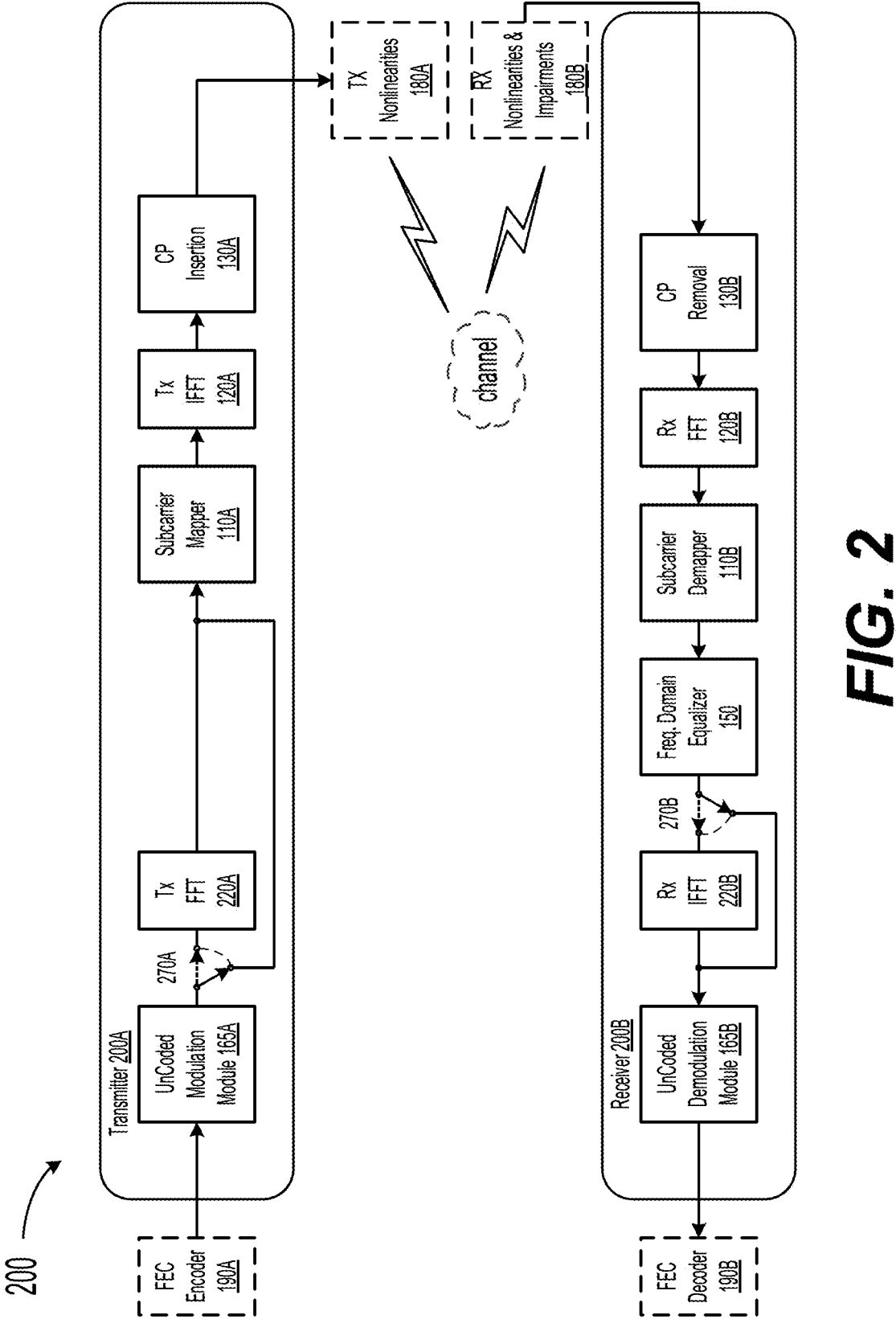
FIG. 2 is a functional block diagram of an exemplary apparatus that can be configured to transmit and receive a variety of waveforms by configuring or bypassing components thereof according to a second embodiment of the present disclosure.

FIG. 2 is a functional block diagram of an exemplary apparatus 200, e.g., a transceiver, that can be configured to transmit and receive a variety of waveforms by configuring or bypassing components thereof, according to a second embodiment of the present disclosure. For example, the transceiver 200 can be configured to transmit and receive CP-OFDM and discrete Fourier transform-spread-OFDM (DFT-s-OFDM) waveforms. Unlike CP-OFDM waveforms, which can be used in both downlink and uplink chains, DFT-s-OFDM waveforms can be used for upload chain only. The transceiver 200 can include a transmitter 200A and a receiver 200B. In an embodiment, the transmitter 200A can further include a transform precoder (or called a DFT unit, e.g., a transmitting (Tx) FFT module) 220A and a Tx FFT switch 270A with the transmitting filter switch 170A and the transmitting filter 140A omitted, as compared with the transmitter 100A of the transceiver 100. In order to prevent an increase in PAPR, the transmitter 200A passes information through the Tx FFT module 220A, i.e., a DFT unit, before mapping a signal to the subcarrier mapper 110A. In another embodiment, the receiver 200B can further include a receiving (Rx) IFFT module 220B and an Rx IFFT switch 270B with the receiving filter switch 170B and the receiving filter 140B omitted, as compared with the receiver 100B of the transceiver 100.

In an embodiment, the coded input signals can be received at the Tx FFT module 220A from the FEC encoder 190A. For example, the modulation module 165A can modulate coded input signals using a modulation scheme such as $\pi/2$-binary phase shift keying (BPSK), QPSK, 16-QAM, 64-QAM, 256-QAM, 1,024-QAM, etc., and generate the CSs. The Tx FFT module 220A can spread the uplink data in a special way to reduce PAPR of the waveforms. Mathematically, the Tx FFT module 220A performs discrete Fourier transform (DFT) on the uplink data. In another embodiment, the Rx IFFT module 220B can perform IFFT and output a base band signal for data that is a time domain signal.

The Tx FFT switch 270A can be configured to load the CSs either to the Tx FFT module 220A or to the subcarrier mapper 110A. For example, the Tx FFT switch 270A can be configured to load the CSs to the subcarrier mapper 110A, i.e., bypassing the Tx FFT module 220A, and therefore the wireless transmitting unit 180A can transmit the CP-OFDM waveforms. As another example, the Tx FFT switch 270A can be configured to load the CSs to the Tx FFT module 220A, and therefore the wireless transmitting unit 180A can transmit the DFT-s-OFDM waveforms. Accordingly, the Rx IFFT module 220B can be configured to connect the frequency domain equalizer 150 either to the Rx IFFT module 220B or to a demodulator module 165B. For example, when the Tx FFT switch 270A is configured to load the CSs to the subcarrier mapper 110A, i.e., bypassing the Tx FFT module 220A, the Rx IFFT switch 270B shall be configured to connect the frequency domain equalizer 150 to the demodulation module 165B, i.e., bypassing the Rx IFFT module 220B. As another example, when the Tx FFT switch 270A is configured to load the CSs to the Tx FFT module 220A, the Rx IFFT switch 270B shall be configured to connect the frequency domain equalizer 150 to the Rx IFFT module 220B.

In the transceiver 200, the subcarrier mapper 110A, the Tx IFFT module 120A and the CP insertion module 130A can be reused to form the CP-OFDM and DFT-s-OFDM waveforms.

Figure 3:
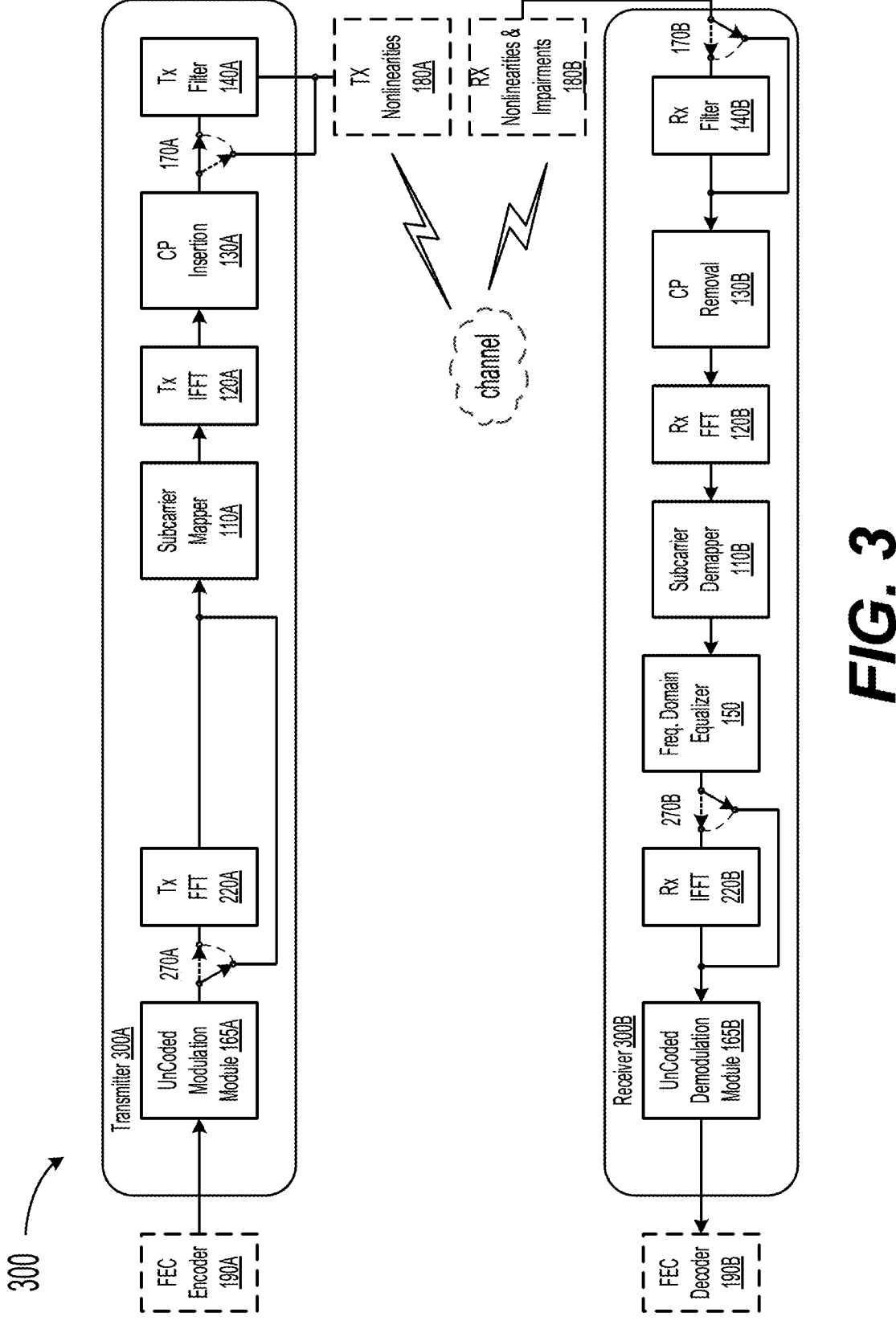
FIG. 3 is a functional block diagram of an exemplary apparatus that can be configured to transmit and receive a variety of waveforms by configuring or bypassing components thereof according to a third embodiment of the present disclosure.

FIG. 3 is a functional block diagram of an exemplary apparatus 300, e.g., a transceiver, that can be configured to transmit and receive a variety of waveforms by configuring or bypassing components thereof, according to a third embodiment of the present disclosure. The apparatus 300 can be a combination of the apparatuses 100 and 200. By configuring the transmitting filter switch 170A, the receiving filter switch 170B, the Tx FFT switch 270A and the Rx IFFT switch 270B, the transceiver 300 can transmit and receive any one of the CP-OFDM, f-OFDM, single-carrier frequency domain equalization (SC-FDE) and DFT-s-OFDM waveforms. DFT-s-OFDM waveforms provide better power amplifier (PA) power efficiency as compared to CP-OFDM due to lower signal PARR. For SC-FDE waveforms, the sizes of the FFTs 220A and 120B and IFFTs 120A and 220B are identical. DFT-s-OFDM waveforms have larger symmetric information rate (SIR) as compared to CP-OFDM waveforms for frequency selective channels. However, when a linear-minimum-mean-square-error (LMMSE) equalizer is used, DFT-s-OFDM waveforms perform worse than CP-OFDM waveforms.

Figure 4:
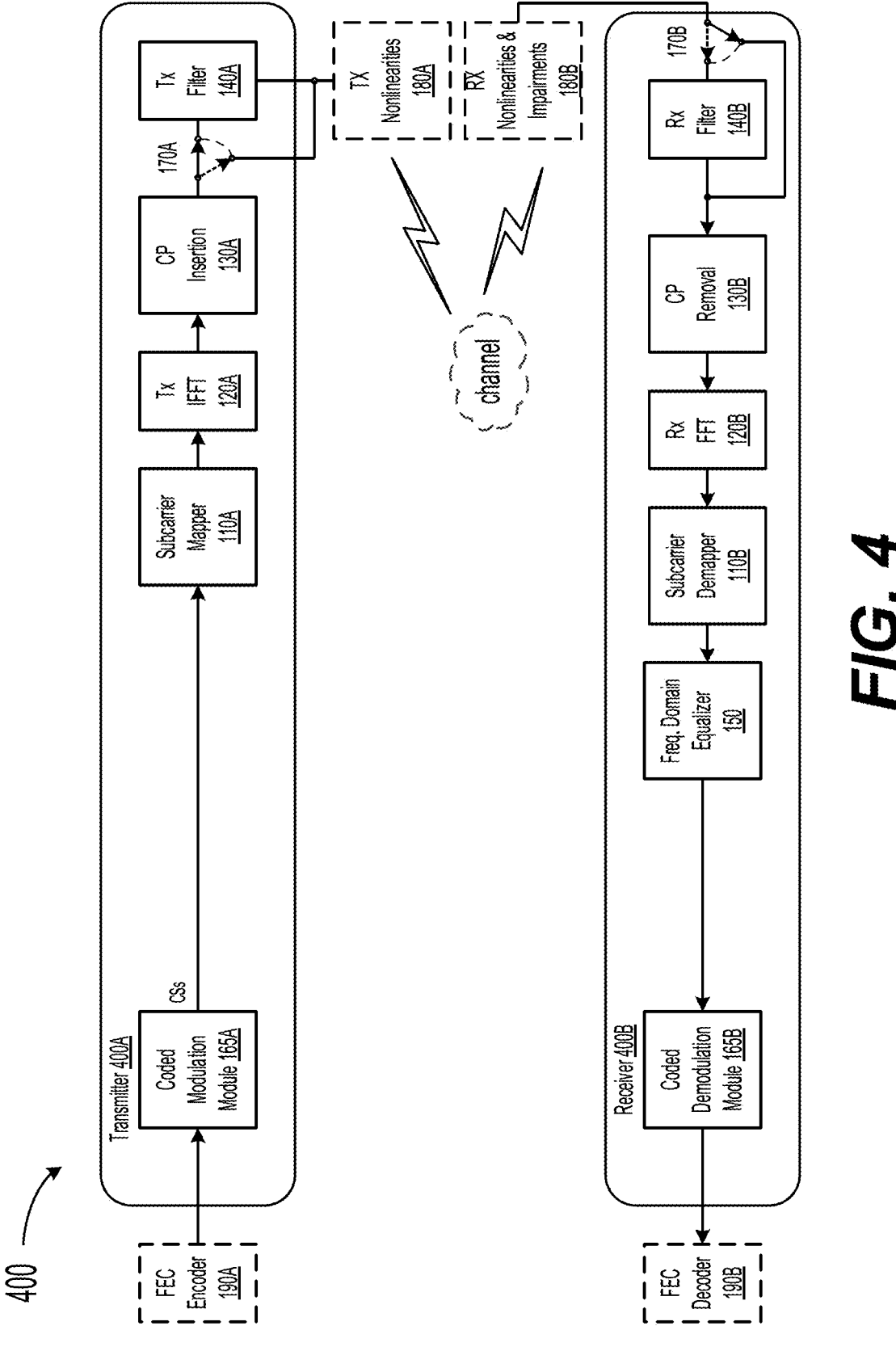
FIG. 4 is a functional block diagram of an exemplary apparatus that can be configured to transmit and receive a variety of waveforms by configuring or bypassing components thereof according to a fourth embodiment of the present disclosure.

FIG. 4 is a functional block diagram of an exemplary apparatus 400, e.g., a transceiver, that can be configured to transmit and receive a variety of waveforms by configuring or bypassing components thereof, according to a fourth embodiment of the present disclosure. The transceiver 400 can include a transmitter 400A and a receiver 400B. In an embodiment, the transceiver 400 differs from the transceiver 100 in that in the transmitter 400A the "uncoded" modulation module 165A is replaced with "coded" modulation module 165A and in the receiver 400B the "uncoded" demodulation module 165B is replaced with "coded" demodulation module 165B, to transmit and receive CP-OFDM waveforms with constellation shaping. In an embodiment, the constellation shaping can be integrated into the waveform framework (i.e., the transmitter 400A and the receiver 400B) to enhance spectral efficiency. For example, the constellation shaping can include trellis constellation shaper, block constellation shaper, etc. In an embodiment, the constellation shaping can provide up to 1.53 dB of shaping gain when applied to QAM modulations. In some embodiments, non-QAM modulation can also be used to obtain shaping gain.

Figure 5:
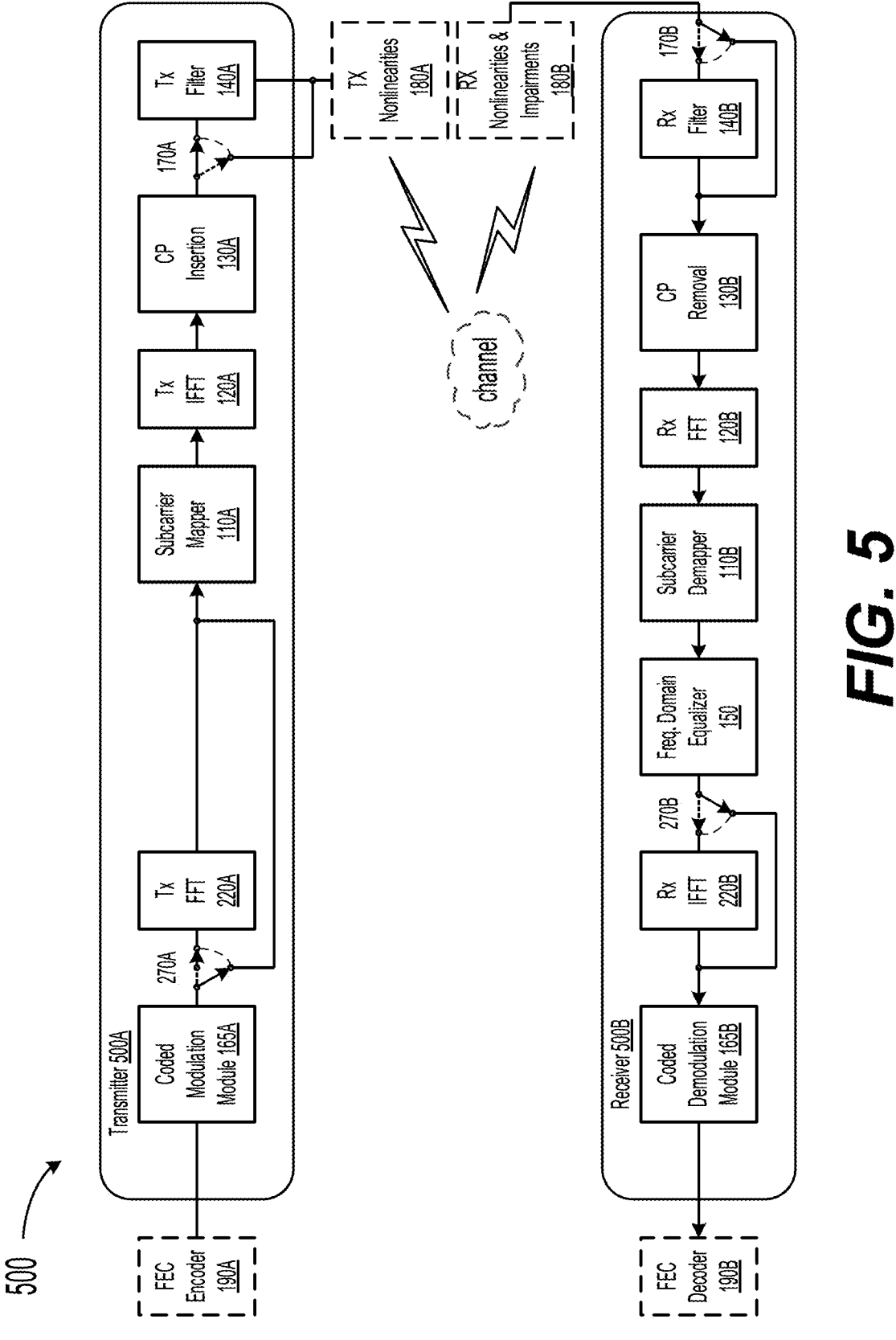
FIG. 5 is a functional block diagram of an exemplary apparatus that can be configured to transmit and receive a variety of waveforms by configuring or bypassing components thereof according to a fifth embodiment of the present disclosure.

FIG. 5 is a functional block diagram of an exemplary apparatus 500, e.g., a transceiver, that can be configured to transmit and receive a variety of waveforms by configuring or bypassing components thereof, according to a fifth embodiment of the present disclosure. The transceiver 500 can include a transmitter 500A and a receiver 500B. In an embodiment, the transceiver 500 differs from the transceiver 300 in that in the transmitter 500A the "uncoded" modulation module 165A is replaced with "coded" modulation module 165A and in the receiver 500B the "uncoded" demodulation module 165B is replaced with "coded" demodulation module 165B, to transmit and receive 1+D pre-coded DFT-s-OFDM waveforms with π/2-BPSK.

In an embodiment, the coded modulation module 165A can be equivalent to a 4-state trellis coded QPSK modulator, and the coded demodulation module 165B can employ a trellis-based Bahl-Cocke-Jelinek-Raviv (BCJR) algorithm. Therefore, the transceiver 500 can further transmit and receive 1+D pre-coded DFT-s-OFDM waveforms, in addition to the CP-OFDM and DFT-s-OFDM waveforms. The 1+D pre-coded DFT-s-OFDM waveforms can be viewed as an approximation for binary CPM waveforms such as minimum shift keying (MSK) and Gaussian minimum shift keying (GMSK) waveforms.

Figure 6:
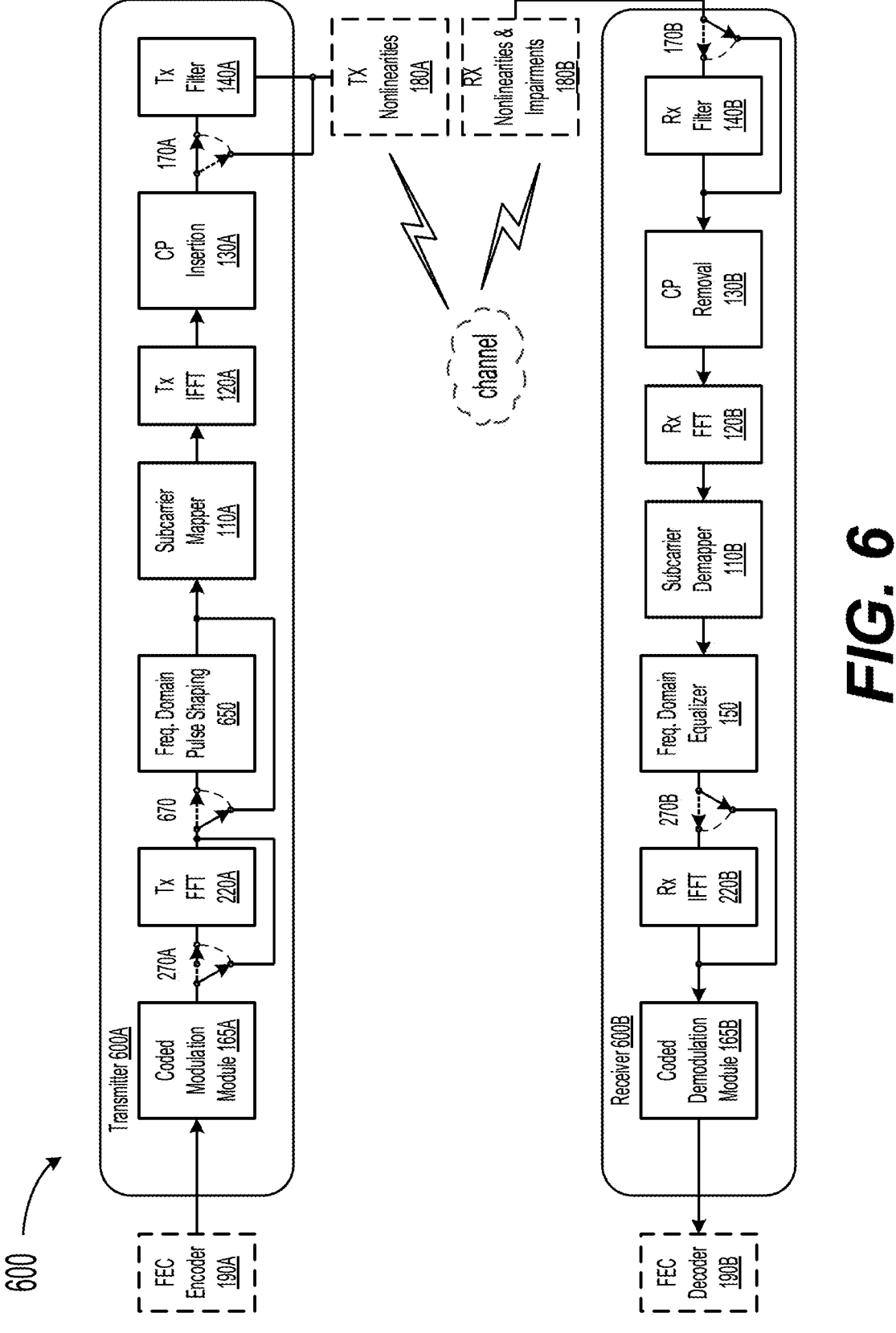
FIG. 6 is a functional block diagram of an exemplary apparatus that can be configured to transmit and receive a variety of waveforms by configuring or bypassing components thereof according to a sixth embodiment of the present disclosure.

FIG. 6 is a functional block diagram of an exemplary apparatus 600, e.g., a transceiver, that can be configured to transmit and receive a variety of waveforms by configuring or bypassing components thereof, according to a sixth embodiment of the present disclosure. The transceiver 600 can include a transmitter 600A and a receiver 600B. In an embodiment, the transmitter 600A can further include a frequency domain pulse shaping module 650 and a shaping switch 670, as compared with the transmitter 500A of the apparatus 500.

In an embodiment, the frequency domain pulse shaping module 650 can be configured to shape the signal output from the Tx FFT module 220A to make the signal suitable to be transmitted through the communication channel mainly by limiting its effective bandwidth to reduce the PAPR and cubic metrics (CM). For example, orthogonal time frequency space (OTFS) modulation scheme can be employed to locate a signal in both time and frequency domain such that each transmitted symbol may experience a near-constant channel gain even the channel is at high carrier frequencies (e.g., mm-wave) or with high Doppler. In an embodiment, OTFS uses FFT as its precoder to spread QAM symbols across time domain prior to DFT-s-OFDM modulation. This improves robustness against highly time selective channels. As another example, a zero crossing modulation (ZXM) modulation scheme can be employed that uses run-length limited (RLL) code as its precoder to encode the information in the temporal distance between zero crossings prior to frequency domain pulse-shaped DFT-s-OFDM modulation. Therefore, the transceiver 600 can transmit and receive TC-DFT-s-OFDM, CPM-DFT-s-OFDM, constrained envelop CPM (CeCPM), etc. CPM is widely used in wireless communication systems due to its relatively low spectral sidelobes, as compared with PSK (rectangular pulse shaped) modulation schemes.

The shaping switch 670 can be configured to connect the Tx FFT module 220A either to the subcarrier mapper 110A, i.e., bypassing the frequency domain pulse shaping module 650, or to the frequency domain pulse shaping module 650.

Figure 7:
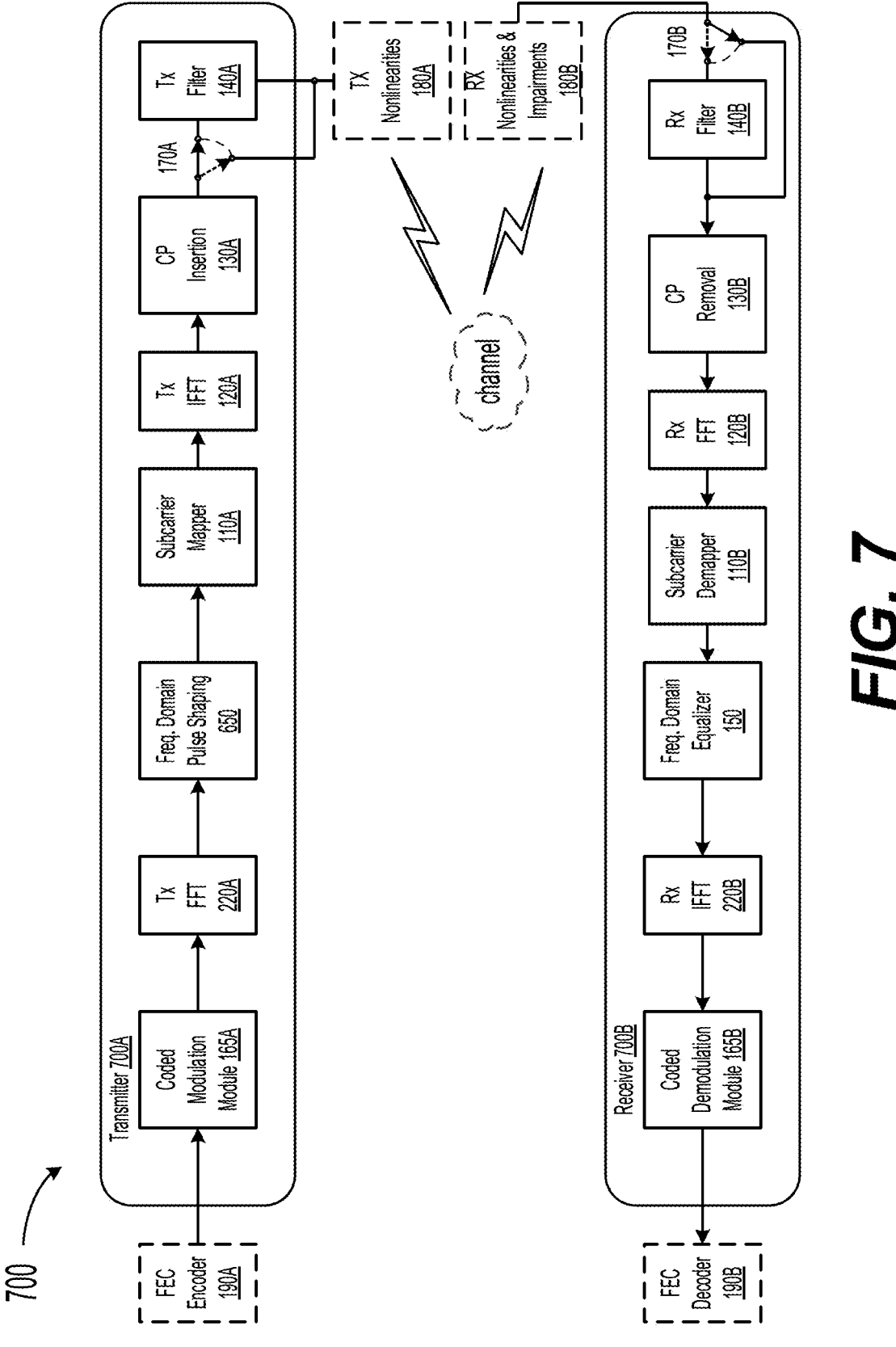
FIG. 7 is a functional block diagram of an exemplary apparatus that can be configured to transmit and receive a variety of waveforms by configuring or bypassing components thereof according to a seventh embodiment of the present disclosure.

FIG. 7 is a functional block diagram of an exemplary apparatus 700, e.g., a transceiver, that can be configured to transmit and receive a variety of waveforms by configuring or bypassing components thereof, according to a seventh embodiment of the present disclosure. The transceiver 700 can include a transmitter 700A and the receiver 700B. In an embodiment, the transmitter 700A can omit the shaping switch 670 and the Tx FFT switch 270A as compared with the transmitter 600A, and the receiver 700B can omit the Rx IFFT switch 270B as compared with the receiver 600B. Therefore, the transceiver 700 can further transmit and receive generalized frequency division multiplexing GFDM waveforms, e.g., CP-OFDM and DFT-s-OFDM waveforms.

In an embodiment, the coded modulation module 165A can employ p-times up-sampling, i.e., insert P-1 zeros after each symbol. Each subcarrier of GFDM is DFT-s-OFDM modulated with frequency domain pulse shaping (i.e., performed by the frequency domain pulse shaping module 650). Higher spectral efficiency, compared to CP-OFDM, can be achieved via proper selection of frequency domain pulse shaping and subcarrier spacing.

Figure 8:
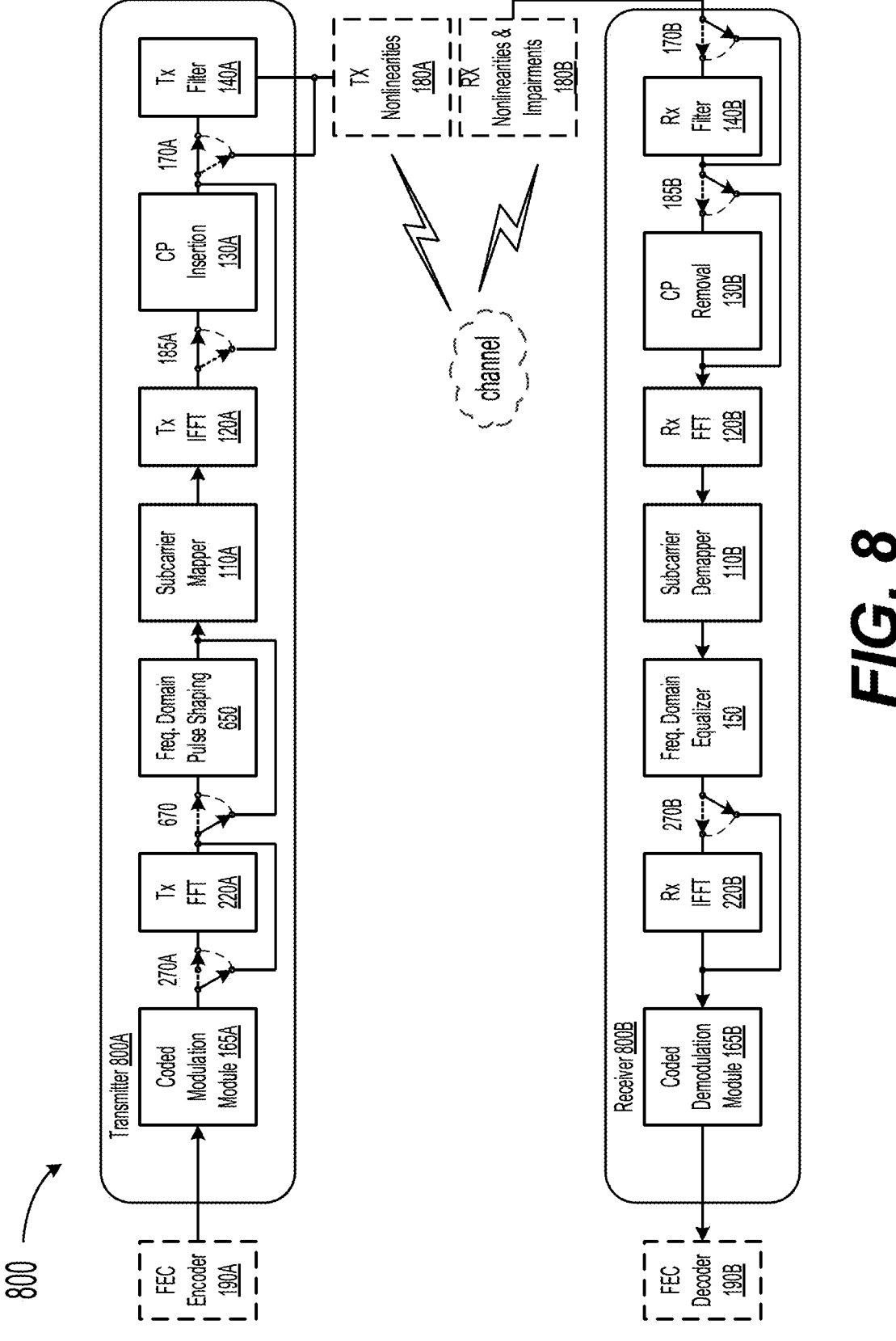
FIG. 8 is a functional block diagram of an exemplary apparatus that can be configured to transmit and receive a variety of waveforms by configuring or bypassing components thereof according to an eighth embodiment of the present disclosure.

FIG. 8 is a functional block diagram of an exemplary apparatus 800, e.g., a transceiver, that can be configured to transmit and receive a variety of waveforms by configuring or bypassing components thereof, according to an eighth embodiment of the present disclosure. The transceiver 800 can include a transmitter 800A and the receiver 800B. In an embodiment, the transmitter 800A can further include a CP insertion switch 185A as compared with the transmitter 600A, and the receiver 800B can further include a CP removal switch 185B as compared with the receiver 600B. For example, the CP insertion switch 185A can be configured to connect the Tx IFFT module 120A either to the CP insertion module 130A or to the transmitting filter 140A. As another example, the CP removal switch 185B can be configured to connect the receiving filter 140B either to the CP removal module 130B or to the Rx FFT module 120B. Therefore, the transceiver 800 can further transmit and receive unique-word (UW) DFT-s-OFDM waveforms, e.g., by configuring the CP removal switch 185A to connect the Tx IFFT module 120A to the transmitting filter 140A, i.e., bypassing the CP insertion module 130A, and configuring the CP removal switch 185B to connect the receiving filter 140B to the Rx FFT module 120B, i.e., bypassing the CP removal module 130B. UW DFT-s-OFDM waveforms have similar PARR properties to the DFT-s-OFDM waveforms, but the known suffix (i.e., the unique word) can be used for symbol acquisition or channel estimation. In an embodiment, the UW insertion (and possibly the tail suppression) can be done prior to the FFT, which is equivalent to coding the constellation symbols with a systematic, nonlinear (affine) block code.

Figure 9:
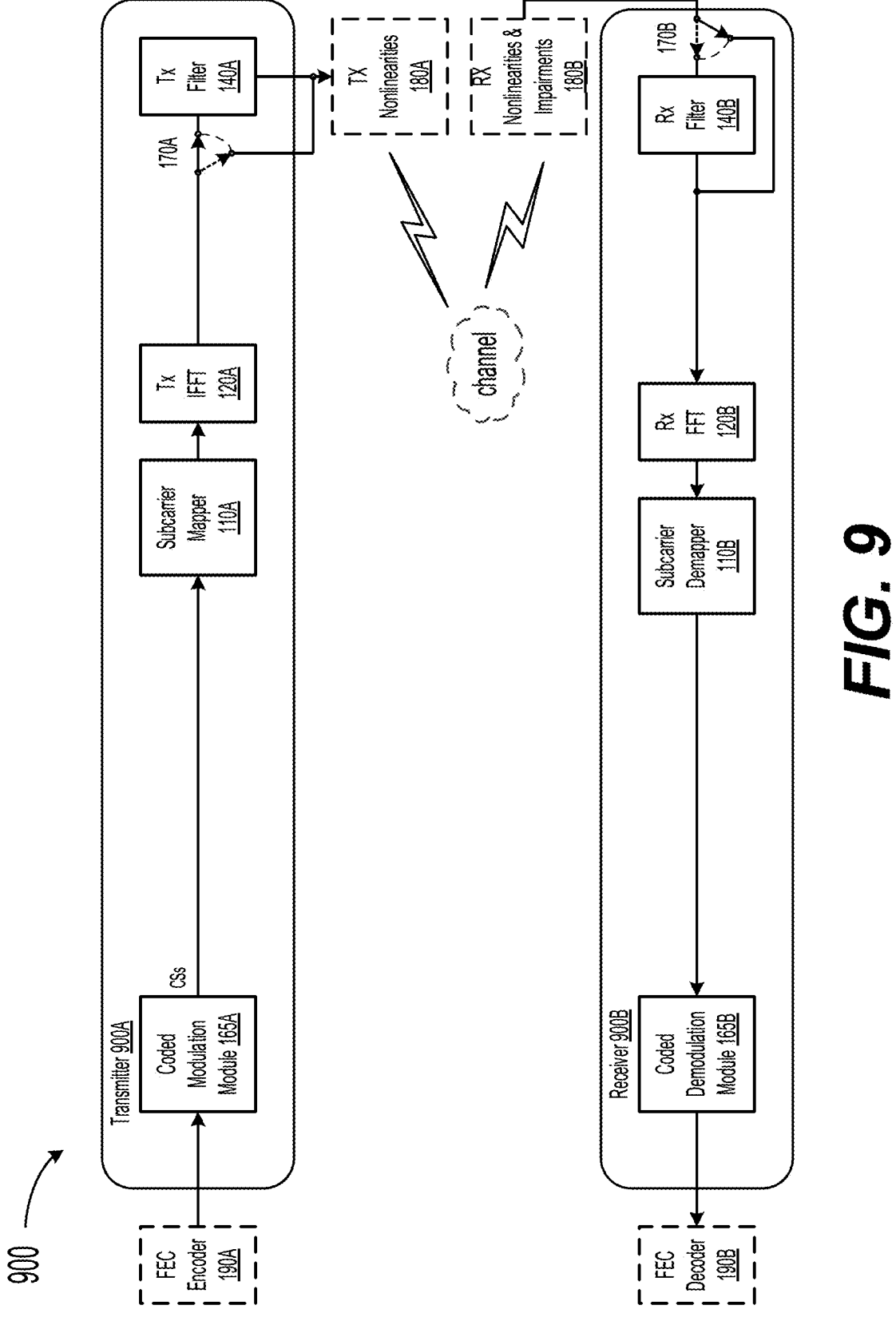
FIG. 9 is a functional block diagram of an exemplary apparatus that can be configured to transmit and receive a variety of waveforms by configuring or bypassing components thereof according to a ninth embodiment of the present disclosure.

FIG. 9 is a functional block diagram of an exemplary apparatus 900, e.g., a transceiver, that can be configured to transmit and receive a variety of waveforms by configuring or bypassing components thereof, according to a ninth embodiment of the present disclosure. The transceiver 900 can include a transmitter 900A and the receiver 900B. In an embodiment, the transmitter 900A can omit the CP insertion module 130A and replace the uncoded modulation module 165A with the coded modulation module 165A as compared with the transmitter 100A, and the receiver 900B can omit the CP removal module 130B and the frequency domain equalizer 150 and replace the uncoded demodulation module 165B with the coded demodulation module 165B as compared with the receiver 100B. Therefore, the transceiver 900 can transmit and receive peaky-FSK waveforms, e.g., by configuring the transmitting filter switch 170A to connect the Tx IFFT module 120A to the transmitting filter 140A and configuring the receiving filter switch 170B to connect the wireless receiving unit 180B to the receiving filter 140B. Peaky-FSK is a combination of frequency shift keying (FSK) and on-off keying (OOK). Since FSK is a special case of orthogonal signal construction, the spectral efficiency of peaky-FSK is generally low. In an embodiment, the coded modulation module 165A can employ a nonlinear code that maps the information bits to a subcarrier index or no transmission. For example, the nonlinear code can have a code rate of $\log_2(N+1)/N$, where N is the number of subcarriers.

Figure 10:
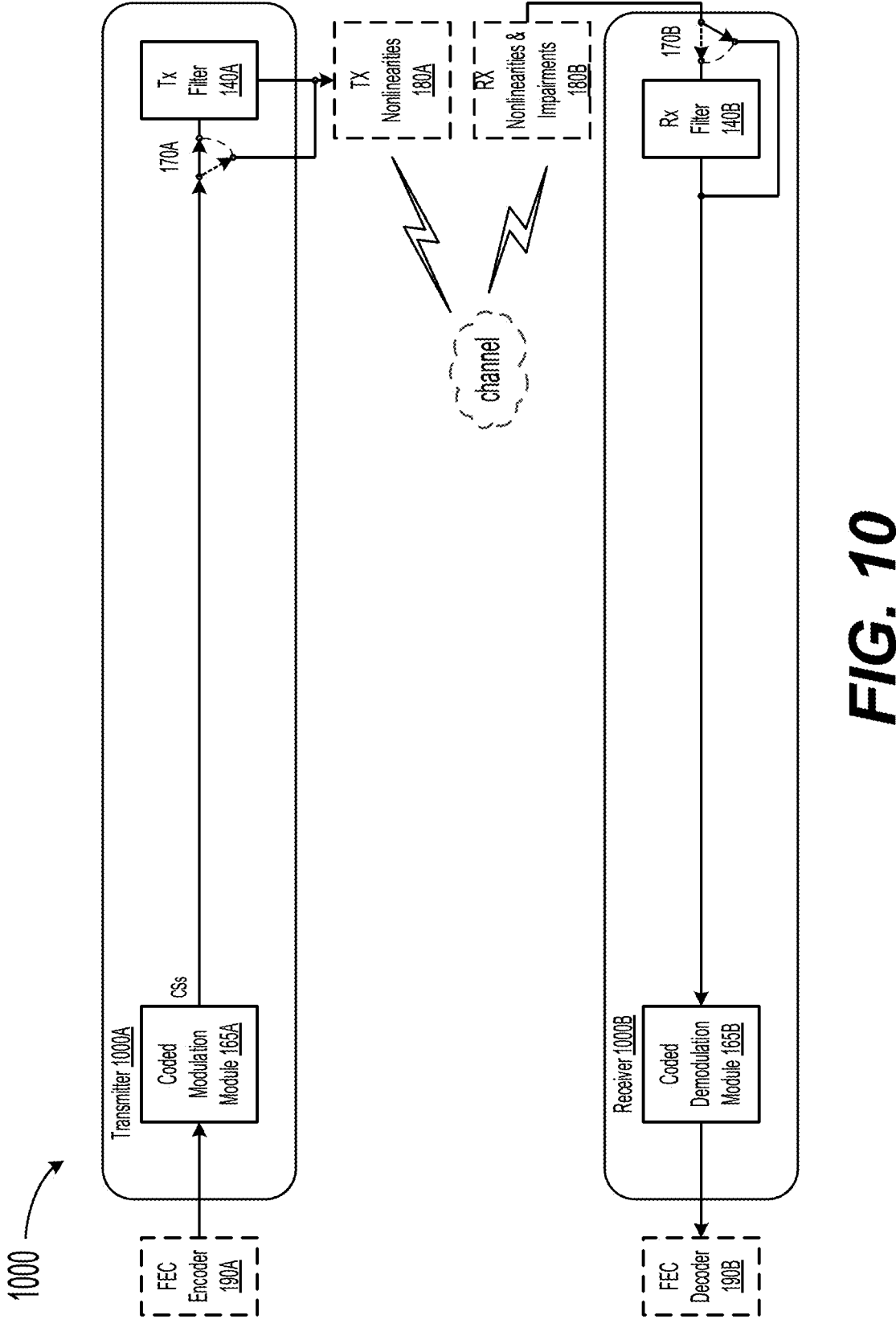
FIG. 10 is a functional block diagram of an exemplary apparatus that can be configured to transmit and receive a variety of waveforms by configuring or bypassing components thereof according to a tenth embodiment of the present disclosure.

FIG. 10 is a functional block diagram of an exemplary apparatus 100, e.g., a transceiver, that can be configured to transmit and receive a variety of waveforms by configuring or bypassing components thereof, according to a tenth embodiment of the present disclosure. The transceiver 1000 can include a transmitter 1000A and the receiver 1000B. In an embodiment, the transmitter 1000A can omit the subcarrier mapper 110A and the Tx IFFT module 120A as compared with the transmitter 900A, and the receiver 1000B can omit the Rx FFT module 120B and the subcarrier demapper 110B as compared with the receiver 900B. Therefore, the transceiver 900 can transmit and receive OOK waveforms, e.g., by configuring the transmitting filter switch 170A to connect the coded modulation module 165A to the transmitting filter 140A and configuring the receiving filter switch 170B to connect the wireless receiving unit 180B to the receiving filter 140B. OOK is a configuration that allows simple Tx implementation and power efficient PA operation. In an embodiment, the coded modulation module 165A can employ a line code (e.g., Miller code) to allow easy synchronization. Accordingly, simple noncoherent energy detection can be used by the coded demodulation module 165B for OOK demodulation.

Figure 11:
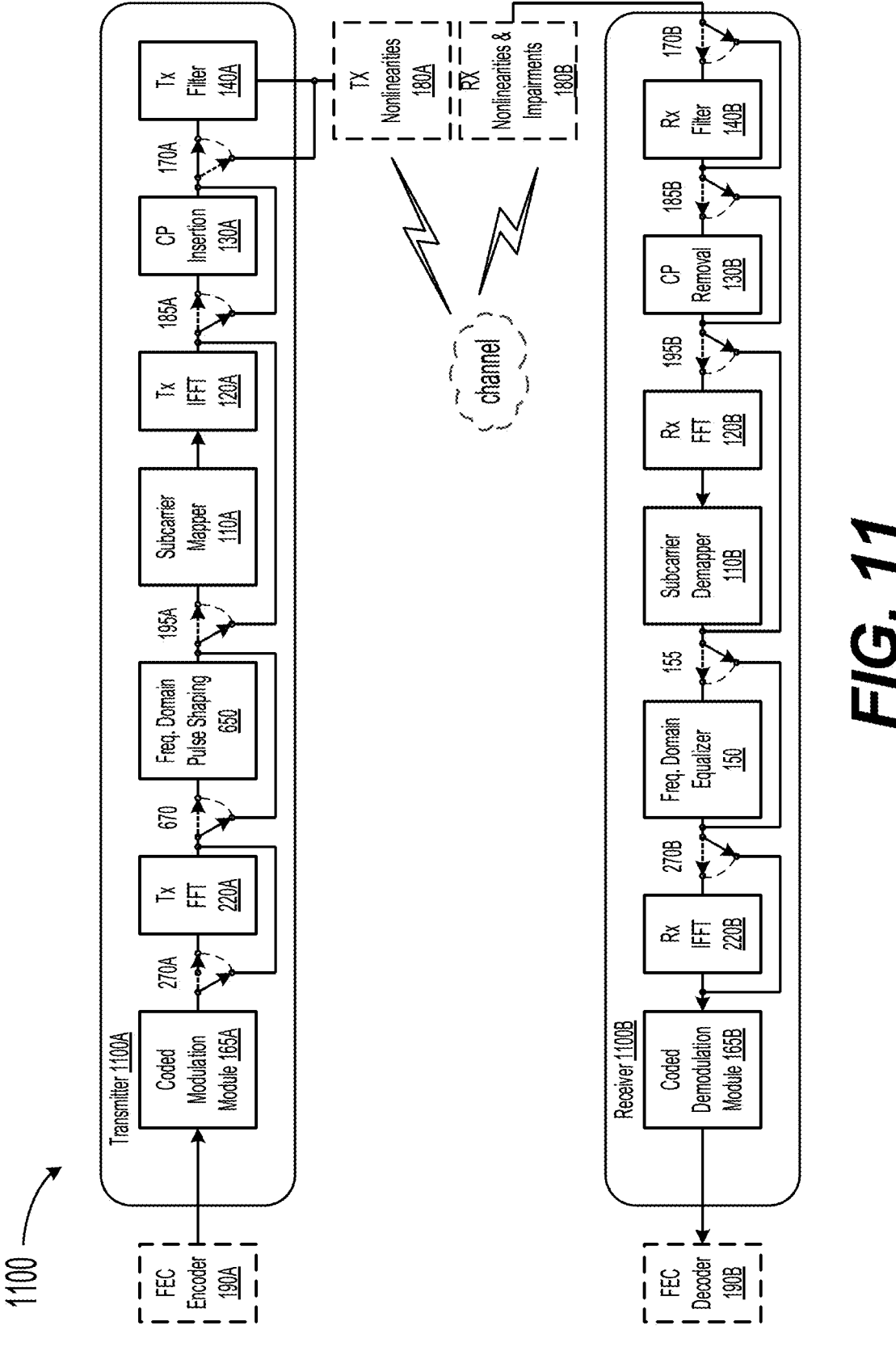
FIG. 11 is a functional block diagram of an exemplary apparatus that can be configured to transmit and receive a variety of waveforms by configuring or bypassing components thereof according to an eleventh embodiment of the present disclosure.

FIG. 11 is a functional block diagram of an exemplary apparatus 1100, e.g., a transceiver, that can be configured to transmit and receive a variety of waveforms by configuring or bypassing components thereof, according to an eleventh embodiment of the present disclosure. The transceiver 1100 can include a transmitter 1100A and a receiver 1100B. The apparatus 1100 can be a combination of the apparatuses 100 to 1000. For example, the transmitter 1100A can include the coded modulation module 165A, the Tx FFT switch 270A, the Tx FFT module 220A, the shaping switch 670, the frequency domain pulse shaping module 650, the subcarrier mapper 110A, the Tx IFFT module 120A, the CP insertion switch 185A, the CP insertion module 130A, the transmitting filter switch 170A and the transmitting filter 140A. The transmitter 1100A can further include a subcarrier mapper switch 195A configured to connect the frequency domain pulse shaping module either to the subcarrier mapper 110A or to the CP insertion module 130A. As another example, the receiver 1100B can include the receiving filter switch 170B, the receiving filter 140B, the CP removal switch 185B, the CP removal module 130B, the Rx FFT module 120B, the subcarrier demapper 110B, the frequency domain equalizer 150, the Rx IFFT switch 270B, the Rx IFFT module 220B, and the coded demodulation module 165B. The receiver 1100B can further include a subcarrier demapper switch 195B configured to connect the CP removal module 130B either to the Rx FFT module 120B or to the frequency domain equalizer 150, and an equalizer switch 155 configured to connect the frequency domain equalizer 150 either to the frequency domain equalizer 150 or to the Rx IFFT module 220B. By configuring the transmitting filter switch 170A, the CP insertion switch 185A, the subcarrier mapper switch 195A, the shaping switch 670, the Tx FFT switch 270A, the receiving filter switch 170B, the CP removal switch 130B, the subcarrier demapper switch 195B, the equalizer switch 155 and the Rx IFFT switch 270B, the transceiver 1100 can transmit and receive any one of the CP-OFDM, f-OFDM, DFT-s-OFDM, 1+D pre-coded DFT-s-OFDM, pre-coded, pulse-shaped DFT-s-OFDM, OOK, peaky-FSK, UW DFT-s-OFDM, SC-FDE and GFDM waveforms by reusing the coded modulation module 165A, the Tx FFT module 220A, the frequency domain pulse shaping module 650, the subcarrier mapper 110A, the Tx IFFT module 120A, the CP insertion module 130A, the transmitting filter 140A, the receiving filter 140B, the CP removal module 130B, the Rx FFT module 120B, the subcarrier demapper 110B, the frequency domain equalizer 150, the Rx IFFT module 220B and the coded demodulation module 165B.

In an embodiment, the transmitting filter switch 170A, the CP insertion switch 185A, the subcarrier mapper switch 195A, the shaping switch 670, the Tx FFT switch 270A, the receiving filter switch 170B, the CP removal switch 130B, the subcarrier demapper switch 195B, the equalizer switch 155 and the Rx IFFT switch 270B can be configured such that the coded modulation module 165A, the Tx FFT module 220A, the frequency domain pulse shaping module 650, the subcarrier mapper 110A and the Tx IFFT module 120A, the CP insertion module 130A, the transmitting filter 140A, the receiving filter 140B, the CP removal module 130B, the Rx FFT module 120B and the subcarrier demapper 110B, the frequency domain equalizer 150, the Rx IFFT module 220B and the coded demodulation module 165B are passed or bypassed, in order for the transceiver 1100 to transmit and receive different waveforms that meet some specific requirements. For example, in order to support high order modulations and MIMO, the transmitting filter switch 170A, the CP insertion switch 185A, the subcarrier mapper switch 195A, the shaping switch 670, the Tx FFT switch 270A, the receiving filter switch 170B, the CP removal switch 130B, the subcarrier demapper switch 195B, the equalizer switch 155 and the Rx IFFT switch 270B can be configured such that the coded modulation module 165A, the Tx FFT module 220A, the frequency domain pulse shaping module 650, the Rx IFFT module 220B and the coded demodulation module 165B are bypassed, and the transceiver 1100 can transmit and receive CP-OFDM and f-OFDM waveforms, allowing the transceiver 1100 to have simple receiver design, or be configured such that the transmitting filter 140A is bypassed, and the transceiver 1100 can transmit and receive DFT-s-OFDM and OTFS waveforms, allowing the transceiver 1100 to have comparable performance. As another example, the transmitting filter switch 170A, the CP insertion switch 185A, the subcarrier mapper switch 195A, the shaping switch 670, the Tx FFT switch 270A, the receiving filter switch 170B, the CP removal switch 130B, the subcarrier demapper switch 195B, the equalizer switch 155 and the Rx IFFT switch 270B can be configured such that the transceiver 1100 can transmit and receive GFDM waveforms with CP overhead reduction, f-OFDM with guard band minimization via OOBE reduction, and GFDM and ZXM waveforms with faster than Nyquist (FTN) and non-orthogonal signaling.

In an embodiment, the frequency domain pulse shaping module 650 of the apparatus 1100 can be bypassed, such as the apparatus 500. In another embodiment, the Tx FFT module 220A, the Rx IFFT module 220B and the frequency domain pulse shaping module 650 of the apparatus 1100 can be bypassed, such as the apparatus 400.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:
1. An apparatus that is configured to generate a variety of waveforms, the apparatus comprising:

one or more reusable components that are coupled in series with each other, the reusable components being configurable to generate a first waveform;

a bypassable component coupled in series with the reusable components, the bypassable component being bypassable or being configurable to operate with the reusable components to generate a second waveform different from the first waveform; and a bypassing controlling component coupled to the reusable components and the bypassable component, the bypassing controlling component being either configured such that the bypassable component is bypassed and the reusable components generate the first waveform, or configured such that the bypassable component is passed and the bypassable component and the reusable components generate the second waveform;

wherein the reusable components include a subcarrier mapper, an inverse fast Fourier transform (IFFT) module coupled to the subcarrier mapper, and a cyclic prefix (CP) insertion module coupled to the IFFT module, the bypassable component includes a filter coupled to the CP insertion module, the bypassing controlling component includes a filter switch, the first waveform includes a CP-orthogonal frequency division multiplexing (CP-OFDM) waveform, and the second waveform includes a filtered-OFDM (f-OFDM) waveform;

wherein the reusable components further include a modulation module coupled to the subcarrier mapper, and the CP-OFDM waveform is with constellation shaping.

2. The apparatus of claim 1, wherein the bypassable component further includes a fast Fourier transform (FFT) module coupled between the modulation module and the subcarrier mapper, the bypassing controlling component further includes a FFT switch, and the second waveform further includes a discrete Fourier transform-spread-OFDM (DFT-s-OFDM) waveform.

3. The apparatus of claim 2, wherein the bypassable component further includes a frequency domain pulse shaping module coupled between the FFT module and the subcarrier mapper, the bypassing controlling component further includes a shaping switch, and the second waveform includes a pre-coded pulse-shaped DFT-s-OFDM waveform.

4. The apparatus of claim 2, further comprising a demodulation module that employs a trellis-based Bahl-Cocke-Jelinek-Raviv (BCJR) decoding algorithm.

5. The apparatus of claim 4, wherein the modulation module is included in a transmitter of the apparatus, and the demodulation module is included in a receiver of the apparatus.

6. The apparatus of claim 1, wherein the bypassable component includes a Fast Fourier Transform (FFT) module coupled to the subcarrier mapper, the bypassing controlling component includes an FFT switch, the first waveform includes the CP-OFDM waveform, and the second waveform includes a discrete Fourier transform-spread-OFDM (DFT-s-OFDM) waveform.

7. The apparatus of claim 6, wherein the reusable components further include a modulation module coupled to the FFT module, and the CP-OFDM waveform is with constellation shaping.

8. The apparatus of claim 7, wherein the bypassable component further includes a filter coupled to the CP insertion module, the bypassing controlling component further includes a filter switch, and the second waveform further includes a f-OFDM waveform and a pre-coded DFT-s-OFDM waveform.

9. The apparatus of claim 8, wherein the bypassable component further includes a frequency domain pulse shaping module coupled between the FFT module and the subcarrier mapper, the bypassing controlling component further includes a shaping switch, and the second waveform further includes a pre-coded pulse-shaped DFT-s-OFDM waveform.

10. The apparatus of claim 1, wherein the reusable components include a Fast Fourier Transform (FFT) module coupled to the modulation module, the subcarrier mapper is coupled to the FFT module, the bypassable component includes a frequency domain pulse shaping module coupled between the FFT module and the subcarrier mapper, the bypassing controlling component includes a shaping switch, the first waveform includes a pre-coded discrete Fourier transform-spread-OFDM (DFT-s-OFDM) waveform, and the second waveform includes a pre-coded pulse-shaped DFT-s-OFDM waveform.

11. The apparatus of claim 10, wherein the pre-coded pulse-shaped DFT-s-OFDM waveform is continuous pulse modulation-DFT-s-OFDM (CPM-DFT-s-OFDM) waveform, a constrained envelop CPM (CeCPM) waveform, or a Trellis Coded-DFT-s-OFDM (TC-DFT-s-OFDM) waveform.

12. The apparatus of claim 10, wherein the modulation module employs a run-length-limited code.

13. The apparatus of claim 10, wherein the second waveform further includes a Generalized Frequency Division Multiplexing (GFDM) waveform.

14. The apparatus of claim 1, wherein the reusable components include a Fast Fourier Transform (FFT) module coupled to the modulation module, a frequency domain pulse shaping module coupled to the FFT module, the subcarrier mapper is coupled to the FFT module, the first waveform includes a pre-coded pulse-shaped discrete Fourier transform-spread-OFDM (DFT-s-OFDM) waveform, and the second waveform includes a Generalized Frequency Division Multiplexing (GFDM) waveform.

15. The apparatus of claim 1, wherein the first waveform includes a modulated waveform, and the second waveform includes an on-off keying (OOK) waveform.

16. The apparatus of claim 1, wherein the reusable components include a filter, the bypassing component includes a subcarrier mapper and a transmitting IFFT module coupled to the subcarrier mapper, the first waveform includes an on-off keying (OOK) waveform, and the second waveform includes a peaky-frequency shift keying (FSK) waveform.

17. The apparatus of claim 16, wherein the bypassable component further includes a CP insertion module coupled between the transmitting IFFT module and the filter, the bypassing controlling component further includes a CP insertion switch, and the second waveform further includes the CP-OFDM waveform.

* * * * *